(12) United States Patent
Estes

(10) Patent No.: US 9,089,143 B2
(45) Date of Patent: Jul. 28, 2015

(54) RECIPROCATING POULTRY CHILLER AUGER

(75) Inventor: Andrew C. Estes, Russellville, AR (US)

(73) Assignee: Cooling & Applied Technology, Inc., Russellville, AR (US)

(*) Notice: Subject to any disclaimer, the term of this patent is extended or adjusted under 35 U.S.C. 154(b) by 306 days.

(21) Appl. No.: 12/932,425

(22) Filed: Feb. 25, 2011

(65) Prior Publication Data

US 2011/0203778 A1 Aug. 25, 2011

Related U.S. Application Data

(60) Provisional application No. 61/338,912, filed on Feb. 25, 2010, provisional application No. 61/338,913, filed on Feb. 25, 2010.

(51) Int. Cl.
| | |
|---|---|
| *A23B 4/06* | (2006.01) |
| *F25D 13/06* | (2006.01) |
| *B65G 33/00* | (2006.01) |
| *A22B 5/00* | (2006.01) |
| *A22C 21/00* | (2006.01) |

(52) U.S. Cl.
CPC .............. *A22B 5/0076* (2013.01); *A22C 21/00* (2013.01)

(58) Field of Classification Search
CPC ....... A22B 5/0076; A22C 21/00; F28F 13/12; A23L 3/36; A23L 3/37; F25D 13/06; F25D 13/065; A23B 4/062; A23B 4/06; A23B 4/09; A23B 4/064; B65G 33/00
USPC .......................... 62/374, 381, 63, 64, 376, 378
See application file for complete search history.

(56) References Cited

U.S. PATENT DOCUMENTS

| | | | |
|---|---|---|---|
| 2,302,169 A | 11/1942 | Baker | |
| 2,418,746 A | 4/1947 | Bartlett et al. | |
| 2,942,429 A | 6/1960 | Van Dolah | |
| 3,092,975 A | 6/1963 | Zebarth | |
| 3,097,501 A * | 7/1963 | Pappas | 62/63 |
| 3,156,566 A | 11/1964 | Williams | |
| 3,240,026 A * | 3/1966 | Dolah et al. | 62/63 |
| 3,250,086 A | 5/1966 | Morris, Jr. | |
| 3,368,363 A | 2/1968 | Alaburda et al. | |
| 3,395,549 A | 8/1968 | Grimes | |

(Continued)

FOREIGN PATENT DOCUMENTS

| | | |
|---|---|---|
| WO | 91/05212 | 4/1991 |
| WO | 99/21429 | 5/1999 |

OTHER PUBLICATIONS

International Search Report and Written Opinion of International Searching Authority, PCT/US2011/000385, Apr. 26, 2011, 13 pages.

*Primary Examiner* — Frantz Jules
*Assistant Examiner* — Martha Tadesse
(74) *Attorney, Agent, or Firm* — Richard Blakely Glasgow

(57) ABSTRACT

A reciprocating poultry chiller auger including a bearing, such as a simple cylindrical bearing, mounting the shaft of an auger-type poultry chiller for both rotation of the shaft and for linear reciprocating motion of the shaft along its axis. The shaft may be reciprocated backward and forward along the axis of the shaft by, for example, a hydraulic cylinder that alternately pushes and pulls the shaft so that it slides linearly in a reciprocating fashion within the bearing. The reciprocating motion of the auger provides agitation of the chilled water in the poultry chiller thus improving contact and heat transfer from poultry carcasses into the chilled water.

13 Claims, 2 Drawing Sheets

(56) References Cited

U.S. PATENT DOCUMENTS

| | | | |
|---|---|---|---|
| 3,410,101 A | 11/1968 | Morris, Jr. | |
| 3,587,241 A | 6/1971 | Hagen | |
| 3,642,495 A | 2/1972 | Davidson et al. | |
| 3,689,958 A | 9/1972 | Dillon | |
| 3,690,109 A * | 9/1972 | Turzillo | 405/241 |
| 3,881,322 A | 5/1975 | Le Diouron | |
| 3,897,976 A * | 8/1975 | Gallis | 299/56 |
| 3,906,743 A | 9/1975 | Schorsch et al. | |
| 3,916,777 A | 11/1975 | Earl | |
| 4,090,453 A * | 5/1978 | Ali et al. | 104/273 |
| 4,129,015 A * | 12/1978 | Morris, Jr. | 62/344 |
| 4,138,860 A | 2/1979 | Drummond | |
| 4,499,740 A | 2/1985 | Older et al. | |
| 4,567,941 A | 2/1986 | Coppolani et al. | |
| 4,569,204 A | 2/1986 | Ott et al. | |
| 4,663,173 A | 5/1987 | Clatfelter et al. | |
| 4,667,370 A | 5/1987 | Brockington et al. | |
| 4,688,476 A | 8/1987 | Zittel | |
| 4,697,508 A | 10/1987 | Tallafus | |
| 4,709,561 A * | 12/1987 | Blackerby | 66/8 |
| 4,761,962 A * | 8/1988 | Andersson | 62/63 |
| 4,774,741 A | 10/1988 | Bernharadt et al. | |
| 4,788,831 A | 12/1988 | Crawford et al. | |
| 4,827,727 A | 5/1989 | Caracciolo | |
| 4,849,237 A | 7/1989 | Hurst | |
| 4,858,488 A * | 8/1989 | Butts | 74/519 |
| 4,860,554 A * | 8/1989 | Innes et al. | 62/374 |
| 4,875,344 A * | 10/1989 | Zittel | 62/381 |
| 4,989,416 A | 2/1991 | Miller et al. | |
| 4,997,578 A | 3/1991 | Berggren | |
| 5,133,249 A | 7/1992 | Zittel | |
| 5,146,841 A | 9/1992 | Zittel | |
| 5,220,812 A * | 6/1993 | Palbiski et al. | 62/381 |
| 5,295,366 A | 3/1994 | Lopez et al. | |
| 5,329,842 A | 7/1994 | Zittel | |
| 5,341,729 A | 8/1994 | Zittel | |
| 5,370,174 A * | 12/1994 | Silvestrini et al. | 165/109.1 |
| 5,377,492 A * | 1/1995 | Robertson et al. | 62/63 |
| 5,390,900 A | 2/1995 | Ginzburg | |
| 5,427,015 A | 6/1995 | Zittel | |
| 5,456,091 A * | 10/1995 | Zittel | 62/375 |
| 5,484,615 A * | 1/1996 | Kounev | 426/238 |
| 5,505,972 A | 4/1996 | Ludwig | |
| 5,562,010 A * | 10/1996 | McGuire | 74/129 |
| 5,592,869 A | 1/1997 | Zittel | |
| 5,669,288 A | 9/1997 | Zittel et al. | |
| 5,692,382 A | 12/1997 | Davison | |
| 5,752,431 A | 5/1998 | Zittel | |
| 5,809,787 A | 9/1998 | Zittel | |
| 5,857,350 A | 1/1999 | Johnson et al. | |
| 5,868,000 A * | 2/1999 | Morris et al. | 62/374 |
| 5,868,065 A | 2/1999 | Haggerty et al. | |
| 5,947,014 A | 9/1999 | Koch | |
| 6,086,833 A | 7/2000 | Conners et al. | |
| 6,089,037 A * | 7/2000 | Miller et al. | 62/314 |
| 6,095,035 A | 8/2000 | Zittel et al. | |
| 6,105,484 A | 8/2000 | Kalthoff et al. | |
| 6,105,490 A | 8/2000 | Horn et al. | |
| 6,205,913 B1 | 3/2001 | Zittel et al. | |
| 6,263,785 B1 | 7/2001 | Zittel | |
| 6,298,686 B1 * | 10/2001 | Moore | 62/380 |
| 6,308,529 B1 * | 10/2001 | Bass | 62/381 |
| 6,397,622 B1 * | 6/2002 | Miller et al. | 62/381 |
| 6,658,886 B1 * | 12/2003 | Bass | 62/381 |
| 6,722,490 B1 * | 4/2004 | Bass | 198/657 |
| 6,865,895 B2 | 3/2005 | Bass | |
| 6,951,273 B2 | 10/2005 | Bass | |
| 7,174,724 B2 | 2/2007 | Morris, III et al. | |
| 7,281,384 B2 * | 10/2007 | Morris et al. | 62/64 |
| 7,470,173 B2 * | 12/2008 | Morris et al. | 452/173 |
| 7,588,489 B2 | 9/2009 | Morris, III et al. | |
| 7,645,472 B2 | 1/2010 | Walker et al. | |
| 2004/0188226 A1 * | 9/2004 | Bass | 198/657 |
| 2006/0264164 A1 | 11/2006 | Voigt et al. | |
| 2007/0144833 A1 * | 6/2007 | Nii et al. | 184/7.1 |
| 2009/0241583 A1 * | 10/2009 | Cathey et al. | 62/375 |

* cited by examiner

RECIPROCATING POULTRY CHILLER AUGER

CROSS-REFERENCE TO RELATED APPLICATIONS

This application claims the benefit of U.S. Provisional Patent Application No. 61/338,912 filed Feb. 25, 2010 and U.S. Provisional Patent Application No. 61/338,913 filed Feb. 25, 2010, both of which are incorporated herein by reference in their entirety.

STATEMENT REGARDING FEDERALLY SPONSORED RESEARCH OR DEVELOPMENT

Not applicable.

BACKGROUND OF THE INVENTION

1. Field of the Invention

The present invention relates to an auger-type poultry chiller, and in particular, to such an apparatus where the shaft of the auger is reciprocated to increase the agitation of the chilled water in the chiller.

2. Brief Description of the Related Art

After evisceration, slaughtered poultry carcasses must be rapidly chilled to preserve the quality of the meat. Various types of poultry chillers are known in the art, but a common type is the auger-type poultry chiller. Auger-type chillers are typically in the form of semi-cylindrical tanks filed with chilled water. The carcasses are placed in one end of the tank and moved to the other end by a rotating auger. In order to prevent clumping of the carcasses and to obtain good contact between the poultry carcasses and the chilled water, the chilled water may agitated by various means, including air bubbles. However, while the prior art techniques for agitating the chilled water provide some agitation sufficient to achieve good contact between the carcasses and the chilled water and to minimize clumping, a more effective technique is needed.

The limitations of the prior art are overcome by the present invention as described below.

BRIEF SUMMARY OF THE INVENTION

The present invention is directed to an apparatus that satisfies this need. The apparatus comprises an auger-type poultry chiller having bearing means such as simple cylindrical bearings for mounting the shaft of the poultry chiller for both rotation of the shaft and for linear reciprocating motion of the shaft along its axis. The shaft is further provided with reciprocating means for moving the shaft in a linear reciprocating fashion backward and forward along the axis of the shaft and with rotating means for rotating the auger.

The reciprocating means may be a hydraulic cylinder that alternately pushes and pulls the shaft so that it slides linearly in a reciprocating fashion within the bearings. The bearings may be simple cylindrical bearing surfaces that allow the cylindrical shaft to rotate freely and to move linearly for at least some distance along the axis of the shaft. It is of course necessary that the chiller tank be sized with respect to the auger so that the auger can freely move within the tank over the axial distance set by the stroke of the reciprocating means.

These and other features, objects and advantages of the present invention will become better understood from a consideration of the following detailed description of the preferred embodiments and appended claim in conjunction with the drawings as described following:

DETAILED DESCRIPTION OF THE INVENTION

Figure 1A:
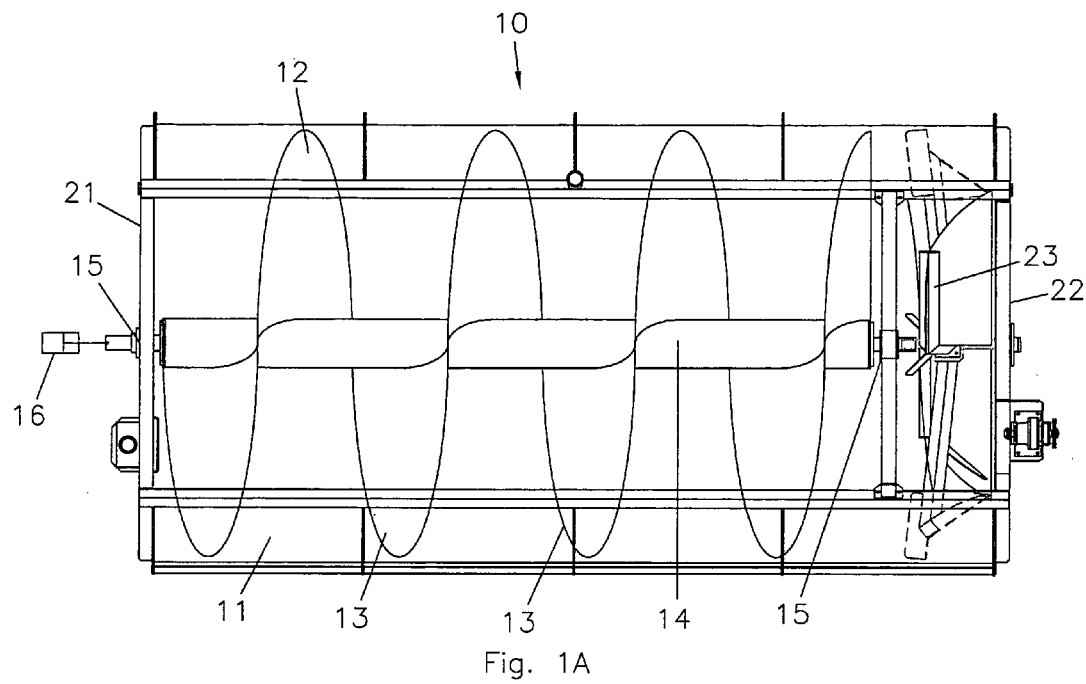
FIG. 1A is an top plan view of an embodiment of an auger-type poultry chiller of the present invention.
Figure 1B:
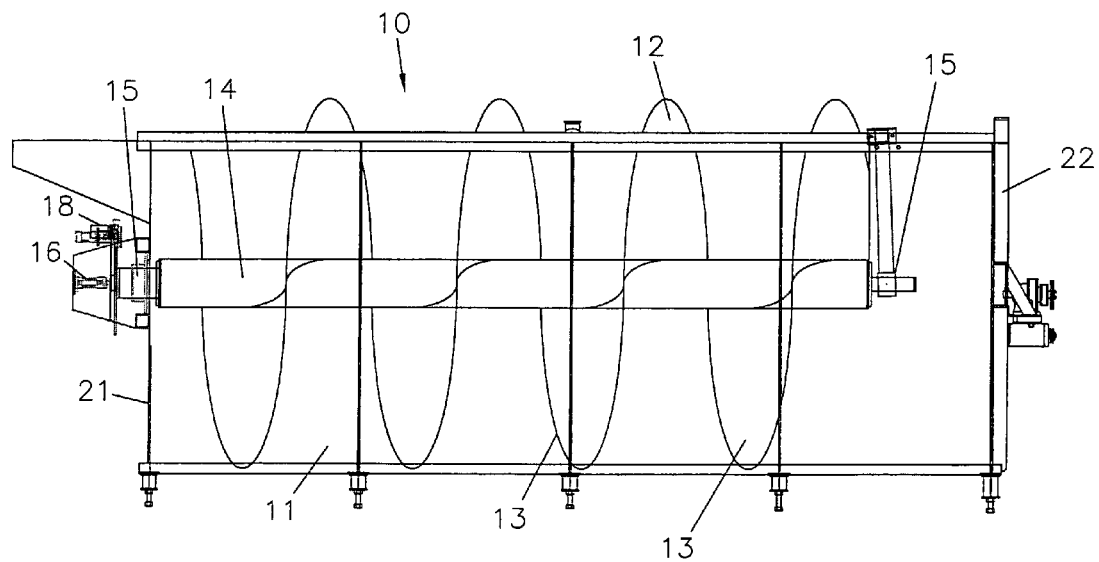
FIG. 1B is a side elevation view of the embodiment of FIG. 1A. The paddle wheel unloader section shown in FIG. 1A is eliminated from this view for clarity.
Figure 2:
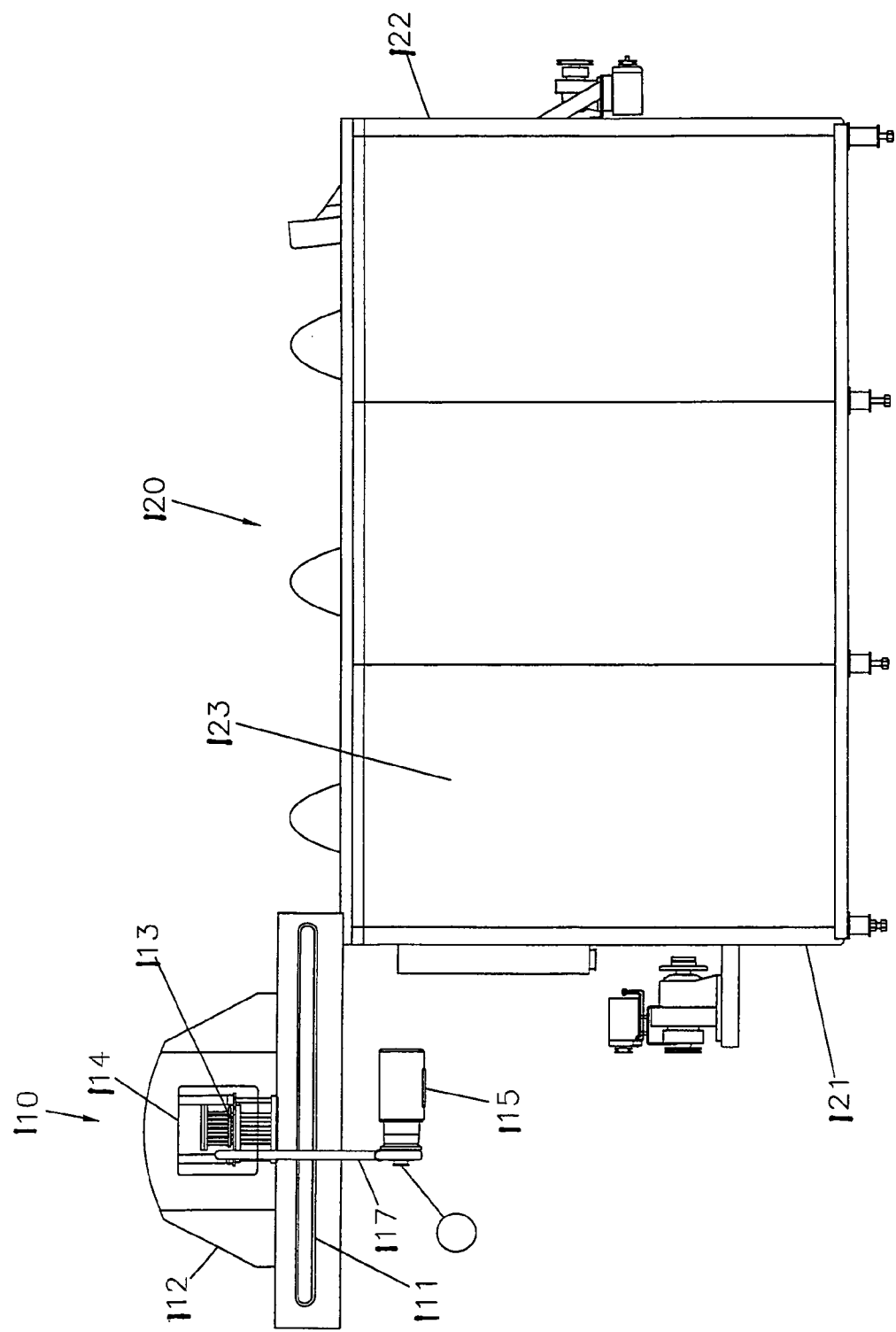
FIG. 2 is a side elevation view of an auger-type poultry chiller having a chilled water injector mounted to the entrance end of the chiller.

With reference to FIGS. 1A-2, the preferred embodiments of the present invention may be described as follows:

FIGS. 1A and 1B show an auger-type poultry chiller 10 which moves poultry carcasses from an entrance end 21 to an exit end 22 against a counter-current flow of chilled water by means of a rotating auger 12. The poultry chiller 10 includes a semi-cylindrical tank 11 in which the auger 12 is mounted for rotation by a motor, such as a shaft mount reducer 18. The auger 12 is made up of a plurality of flights 13 disposed on a shaft 14. The auger 12 is mounted onto two bearing means located at either end of the auger 12. In an embodiment of the auger 12 of the present invention, the bearing means allow for both rotary motion of the auger 12 and linear reciprocating motion where the shaft 14 and the auger 12 are able to move backward and forward along the axis of the shaft 14. The bearing means may be simple cylindrical bearings 15 allowing for both rotation of the shaft 14 and linear reciprocating motion of the shaft 14 along its axis. The shaft 14 is further provided with reciprocating means for moving the shaft 14 in a linear reciprocating fashion backward and forward along the axis of the shaft 14.

The reciprocating means may be a hydraulic cylinder 16 that alternately pushes and pulls the shaft 14 so that it slides linearly in a reciprocating fashion within the cylindrical bearings 15. The cylindrical bearings 15 have a cylindrical bearing surface that allows the cylindrical shaft to rotate freely and to move linearly for at least some distance along the axis of the shaft 14. The stroke of the reciprocating means may be of any length that is considered desirable for a particular application. As an example, three (3) inches may be suitable for some applications, but the present invention is not limited to a stroke of this length. It is of course necessary that the chiller tank 11 be sized with respect to the auger 12 so that the auger 12 can freely move within the tank 11 over the axial distance set by the stroke of the reciprocating means.

Since the auger 12, particularly the flights 13, and the structure of the chiller tank 11 itself will be subjected to substantial stresses as a result of the reciprocating action of the auger 12, the structure of the auger 12 and the chiller tank 11 must be designed and constructed to withstand such stresses. The present invention may be retrofitted to an existing chiller or may be incorporated into a newly constructed chiller.

As noted above the auger 12 may be rotated by a motor such as a shaftmount reducer 18 that moves with the auger 12. Rotation of the auger 12 may also be accomplished simply by the back and forth motion of the shaft 14 without the necessity of a separate means of rotating the auger.

The reciprocating auger of the present invention may be used in combination with the injection of chilled water into the poultry carcasses immediately prior to the introduction of the poultry carcasses to the chiller. By combining injection of chilled water directly into the poultry carcasses with the greater heat transfer in the chiller due to the reciprocating motion of the auger, more rapid cooling of the poultry carcasses may eliminate the need for chilling after the main chiller and for post chill decontamination.

The chilled water, which may be at a temperature slightly above the freezing point of water, is able to immediately begin the chilling process since the chilled water is introduced into the warm interior of the carcass and is not limited by the rate of heat transfer from the interior to the surface of the carcass. As a result the carcass is cooled more rapidly and does not require the extended residence time in the chiller needed for conventional chilling. The length of the chiller can be reduced, pre-chilling and post-chilling eliminated and bacterial contamination reduced.

As shown in FIG. 2, the chilled water injector 110 is mounted to the entrance end 121 of the chiller 120. The freshly slaughtered and eviscerated poultry carcasses are removed from a shackle line (not shown) and placed on a conveyor 111 which conveys the warm carcasses past the injector 112. In the injector 112, a plurality of needles 113 are disposed within a head 114. The head 114 may comprise an upper and a lower manifold plate (not shown) providing a conduit though which the chilled water passes. An optional air head may be attached to the head 114 allowing the needles 113 to retract when they encounter a bone in a poultry carcass.

A pump 115 receives chilled water 116 from a source of chilled water which may be any type of refrigeration apparatus known to those skilled in the art. The pump 115 increases the pressure of the chilled water 116 and delivers the pressurized chilled water 116 to the needles 113 through a delivery line 117.

The head 114 moves up and down, for example by 4 to 8 inches, as the conveyor 111 indexes forward, for example 4 to 8 inches at a time.

The needles 113 inject the pressurized chilled water 116 into the poultry carcasses thereby beginning the chilling process. The chilled water 116 may also include brines, flavorings and other additives as known in the art. The injected carcasses then drop onto the conveyor 111 and thence into the chiller 120 where they are conveyed from the entrance end 121 to the exit end 122 through a counter-flow of chilled water 123 during which time further chilling occurs. At the exit end 122 of the chiller 120, the chilled carcasses are removed by conventional means, such as paddle wheel unloader 23, and continue to further processing steps.

The present invention has been described with reference to certain preferred and alternative embodiments that are intended to be exemplary only and not limiting to the full scope of the present invention as set forth in the appended claims.

What is claimed is:

1. A poultry chiller, comprising:
   a tank for receiving chilled water and poultry carcasses, wherein said tank comprises an auger section, wherein said auger section of said tank comprises a first end and a second end; and
   an auger disposed within said auger section of said tank, wherein said auger comprises a shaft having an axis extending between said first end of said auger section and said second end of said auger section, wherein said auger rotates around said axis of said shaft to move said poultry carcasses from said first end of said auger section of said tank to said second end of said auger section of said tank, wherein said auger moves linearly within said auger section and along said axis of said shaft to agitate said chilled water in said auger section of said tank, wherein said auger section of said tank is sized to permit a stroke of said auger.

2. The poultry chiller of claim 1 further comprising a hydraulic cylinder.

3. The poultry chiller of claim 1 further comprising a shaft-mount reducer.

4. The poultry chiller of claim 2, wherein said hydraulic cylinder is characterized by a stroke of about three (3) inches.

5. The poultry chiller of claim 1, further comprising a first bearing and a second bearing.

6. A poultry chiller, comprising:
   a tank for receiving chilled water and poultry carcasses, wherein said tank comprises an auger section, wherein said auger section of said tank comprises a first end and a second end; and
   an auger positioned within said auger section of said tank, wherein said auger comprises a shaft and a spiral blade, wherein said shaft is positioned between a first bearing at said first end of said auger section and a second bearing at said second end of said auger section, wherein said shaft has an axis extending between said first end and said second end of said auger section, wherein said shaft moves rotationally within said first bearing and said second bearing and moves linearly along said axis of said shaft, wherein said auger section of said tank is sized to permit a stroke of said auger.

7. The poultry chiller of claim 6 further comprising a hydraulic cylinder.

8. The poultry chiller of claim 6 further comprising a shaft-mount reducer.

9. The poultry chiller of claim 6 wherein said hydraulic cylinder is characterized by a stroke of about three (3) inches.

10. A method of chilling poultry comprising the steps of:
    providing a poultry chiller comprising a tank for receiving chilled water and poultry carcasses, wherein said tank comprises an auger section, wherein said auger section of said tank comprises a first end and a second end, wherein an auger is disposed within said tank, wherein said auger comprises a shaft and wherein said shaft has an axis extending between said first end and said second end of said auger section, wherein said auger section of said tank is sized to permit a stroke of said auger;
    rotating said auger to move said poultry carcasses from said first end of said auger section of said tank to said second end of said auger section of said tank;
    moving said auger linearly between said first end of said auger section and said second end of said auger section and along said axis of said shaft to agitate said chilled water in said tank.

11. The poultry chiller of claim 1, further comprising an unloader section, wherein an unloader paddle wheel is positioned within said unloader section of said tank.

12. The poultry chiller of claim 6, further comprising an unloader section, wherein an unloader paddle wheel is positioned within said unloader section of said tank.

13. The method of chilling poultry of claim 10, further comprising the step of rotating an unloader paddle wheel positioned in an unloader section of said tank to remove said poultry carcasses from said tank.

* * * * *